United States Patent
Zhou

(10) Patent No.: US 8,917,988 B2
(45) Date of Patent: Dec. 23, 2014

(54) END-TO-END CARRIER FREQUENCY CONTROL TO IMPROVE BANDWIDTH UTILIZATION IN AN OPTICAL NETWORK

(71) Applicant: AT&T Intellectual Property I, L.P., Atlanta, GA (US)

(72) Inventor: Xiang Zhou, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 157 days.

(21) Appl. No.: 13/707,841

(22) Filed: Dec. 7, 2012

(65) Prior Publication Data

US 2014/0161443 A1 Jun. 12, 2014

(51) Int. Cl.
*H04J 14/02* (2006.01)

(52) U.S. Cl.
CPC .................................. *H04J 14/021* (2013.01)
USPC ................... 398/27; 398/34; 398/83; 398/25; 398/33; 398/16

(58) Field of Classification Search
CPC ...................................................... H04J 14/021
USPC ............................................... 398/27, 34, 83
See application file for complete search history.

(56) References Cited

U.S. PATENT DOCUMENTS

| | | | |
|---|---|---|---|
| 6,323,978 B1 * | 11/2001 | Harley et al. | 398/30 |
| 8,045,852 B2 * | 10/2011 | Butler et al. | 398/27 |
| 2004/0105684 A1 * | 6/2004 | Marutani et al. | 398/147 |
| 2009/0208203 A1 * | 8/2009 | Chiu et al. | 398/16 |
| 2009/0327901 A1 * | 12/2009 | Kapadia et al. | 715/735 |
| 2010/0021166 A1 * | 1/2010 | Way | 398/79 |
| 2010/0092168 A1 * | 4/2010 | Li et al. | 398/16 |
| 2010/0202777 A1 * | 8/2010 | Liu et al. | 398/83 |
| 2012/0170929 A1 * | 7/2012 | Xie et al. | 398/33 |
| 2013/0058650 A1 * | 3/2013 | Bouda | 398/48 |
| 2013/0336658 A1 * | 12/2013 | Xia et al. | 398/83 |

OTHER PUBLICATIONS

ROADM Evolves: Should You Be Paying Attention?, Infonetics Research, pp. 1-19 (Feb. 2006).
Nazim et al., "Hitless Recovery from Link Failures in Networks with Arbitrary Topology", Jun. 2, 2011.
Tanimura et al., "Digital Clock Recovery Algorithm for Optical Coherent Receivers Operating Independent of Laser Frequency Offset", ECOC, pp. 35-36 (Sep. 2008).
OIF Optical Internetworking Forum, "Integrable Tunable Laser Assembly MSA", pp. 1-103 (Nov. 22, 2005).
John G. Proakis, "Digital Communications", Third Edition, pp. 284 (1995).

* cited by examiner

*Primary Examiner* — David Payne
*Assistant Examiner* — Omar S Ismail
(74) *Attorney, Agent, or Firm* — Hoffmann & Baron, LLP

(57) ABSTRACT

A system to provide carrier frequency control in an optical network includes a first network element monitoring performance information and a second network element coupled to the first network element by the optical network. The second network element receives performance information from the first network element using an administration channel bandwidth, and modifies a carrier frequency associated with the second network element based on the performance information such that the carrier frequency is aligned to a center of a signal channel bandwidth. A method of providing carrier frequency control includes transmitting performance information by the first network element to the second network element using an administration channel bandwidth, and modifying the carrier frequency by the second network element based on the performance information such that the carrier frequency is aligned to the center of the signal channel bandwidth. The administrative channel bandwidth can be within or outside the signal channel bandwidth. A corresponding computer-readable device is disclosed.

18 Claims, 3 Drawing Sheets

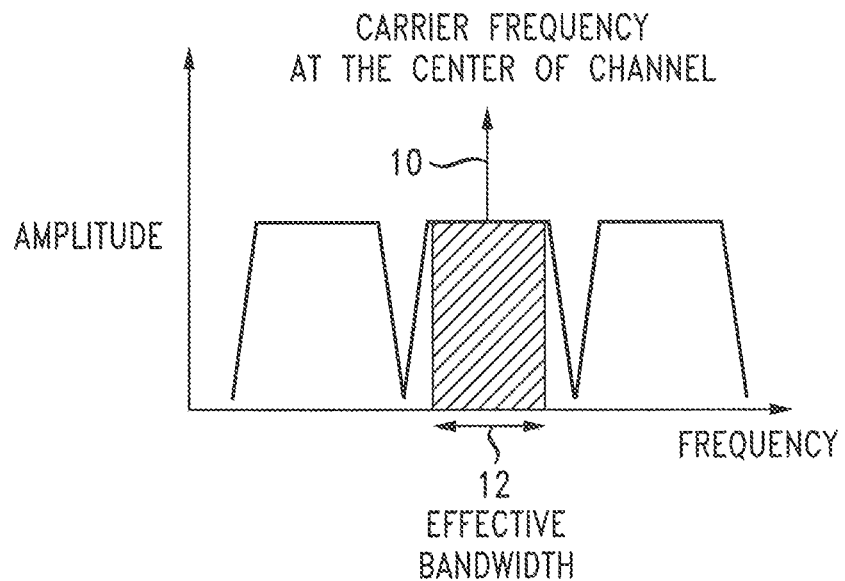
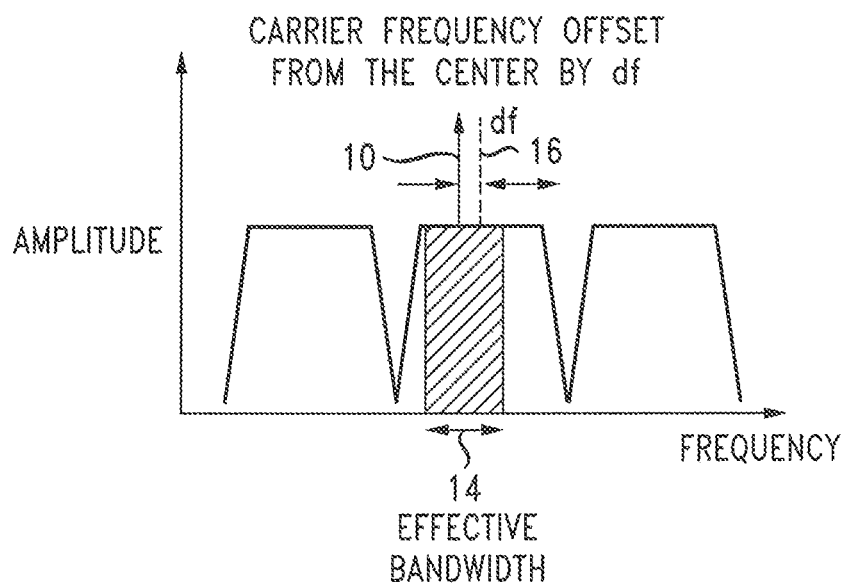

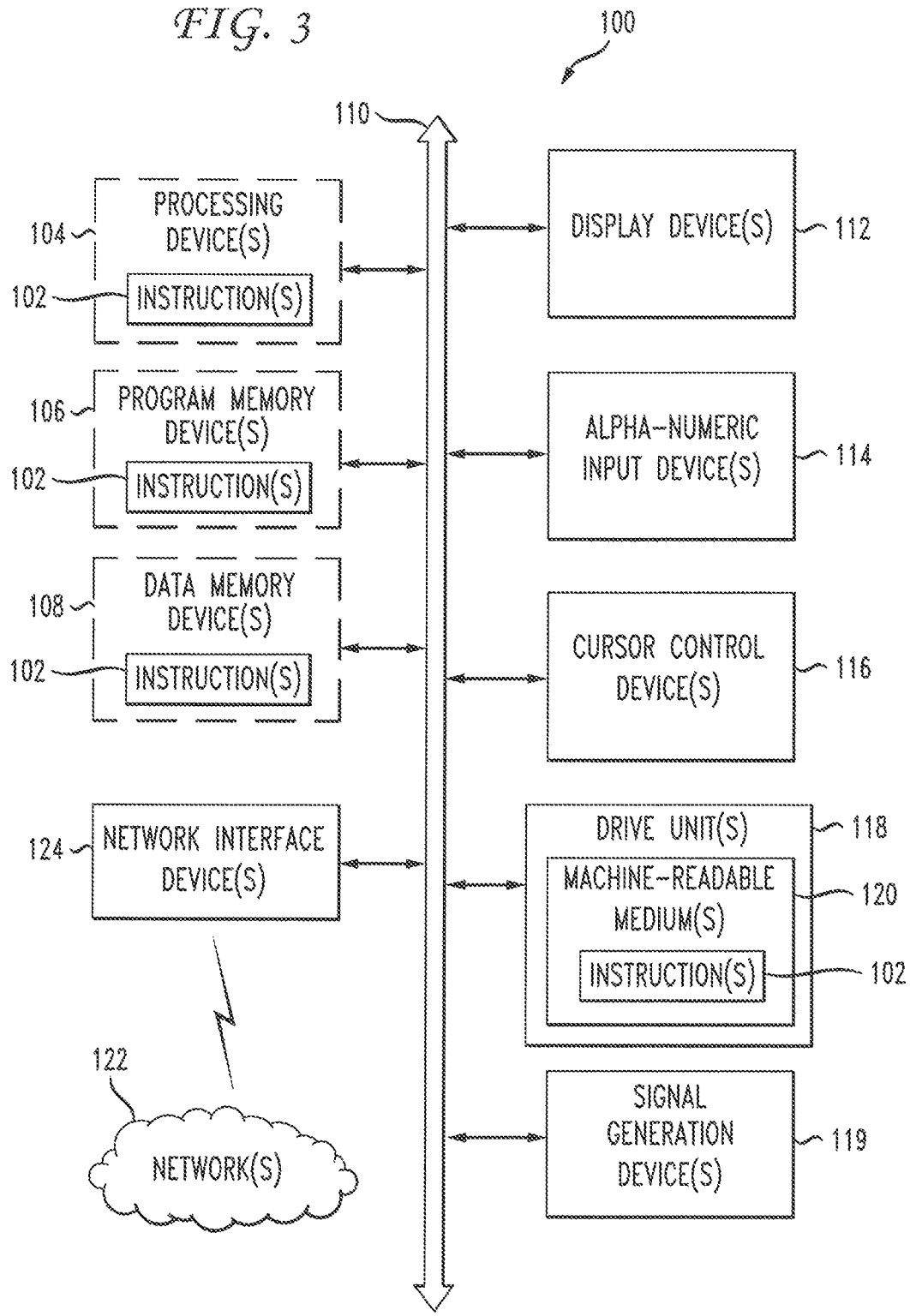

END-TO-END CARRIER FREQUENCY CONTROL TO IMPROVE BANDWIDTH UTILIZATION IN AN OPTICAL NETWORK

BACKGROUND

1. Technical Field

The present disclosure relates to optical networks, and more specifically relates to generating reachability matrices to aid in routing across multiple vendor domains in an optical network.

2. Related Art

Nothing is surer than the increasing use of bandwidth. Over the past 10-15 years, carriers have met increasing bandwidth needs in their transport networks with wave division multiplexing (WDM) to introduce more bandwidth on a single fiber, initially for point-to-point fiber exhaust situations, then for ring transport. The need for more bandwidth flexibility, operational efficiencies, and technology advances brought about an optical add/drop multiplexer, or OADM, to add or drop off wavelengths at a node point. OADM uses fixed lasers and filters for fixed wavelengths, and is thus called a fixed OADM, or F-OADM.

However, carriers can never know when or where the next rush of bandwidth will come from, thus driving urgency for quick provisioning and re-provisioning of large amounts of bandwidth coursing over the wavelengths of a WDM network. Thus, the next logical step has become the remotely reconfigurable optical add/drop multiplexer, or ROADM. An improvement on F-OADMs, ROADMs allow wavelength add/drops at a node point to be remotely reconfigured, rather than requiring a technician to install add/drop lasers and filters with specific wavelengths into a WDM system node, and equalize power levels of wavelengths to enable cooperation on the same fiber.

SUMMARY

Features of the disclosure will become apparent from the following detailed description considered in conjunction with the accompanying drawings. It is to be understood, however, that the drawings are designed as an illustration only and not as a definition of the limits of this disclosure.

The disclosure is directed to a system to provide carrier frequency control in an optical network, which includes a processing device and a memory to store instructions that, when executed by the processing device perform operations. The operations include monitoring performance information associated with the optical network, transferring the performance information from a first network element to a second network element using an administrative channel and an administrative channel bandwidth, and modifying a carrier frequency associated with the second network element based on the performance information such that the carrier frequency is aligned to a center of a signal channel bandwidth.

The performance information may include carrier frequency offset information determined by the first network element, and the second network element may determine carrier frequency offset information based on the performance information. The first network element may include a receiver, and the second network element may include a transmitter. The performance information may include carrier frequency offset information, pre-forward error correction bit error ratio information, spectral shape information associated with a received optical signal, and/or spectral shape information associated with an adaptive filter in a coherent receiver. The pre-forward error correction bit error ratio information may be calculated using an error-corrected signal as a reference signal and assuming no errors following error correction decoding. The administrative channel bandwidth may be used to transfer service provisioning information, and the optical network may include a remotely reconfigurable optical add/drop multiplexer network. The first network element may monitor outermost subcarriers in response to frequency locked sub-carriers being within the signal channel bandwidth and the first network element may monitor a plurality of subcarriers in response to sub-carriers generated by independent laser sources being within the signal channel bandwidth.

The disclosure is also directed to a method of providing carrier frequency control in an optical network, which includes transmitting performance information associated with the optical network by a first network element to a second network element using a administration channel bandwidth, and modifying the carrier frequency by the second network element based on the performance information such that the carrier frequency is aligned to a center of a signal channel bandwidth. The administration channel bandwidth may be within the signal channel bandwidth (e.g. by adding management overhead into the signal channel or signal channel bandwidth) or outside or independent from the signal channel bandwidth, such as by using the supervisory channel.

The performance information may include carrier frequency offset information determined by the first network element, and the second network element may determine the carrier frequency offset information based on the performance information. The method may include monitoring outermost subcarriers by the first network element in response to frequency locked sub-carriers being within the signal channel bandwidth, and monitoring a plurality of subcarriers by the first network element in response to sub-carriers generated by independent laser sources being within the signal channel bandwidth.

The disclosure is further directed to a computer-readable device to store instructions that, when executed by a processing device, cause the processing device to perform operations, which include transmitting performance information associated with the optical network by a first network element to a second network element using a administration channel bandwidth, and modifying the carrier frequency by the second network element based on the performance information such that the carrier frequency is aligned to a center of a signal channel bandwidth. The administration channel bandwidth may be within the signal channel bandwidth (e.g. by adding management overhead into the signal channel or signal channel bandwidth) or outside or independent from the signal channel bandwidth, such as by using the supervisory channel.

Embodiments disclosed herein will become apparent from the following detailed description, which is to be read in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

FIG. 1A shows an effect of carrier frequency drift on effective channel bandwidth when a carrier frequency is aligned to a center of a channel;

FIG. 1B shows the effect of carrier frequency drift on effective channel bandwidth when the carrier frequency is not aligned to the center of the channel;

FIG. 3 is a block diagram showing at least a portion of an exemplary machine in the form of a computing system configured to perform methods according to one or more embodiments disclosed herein.

Figure 2:
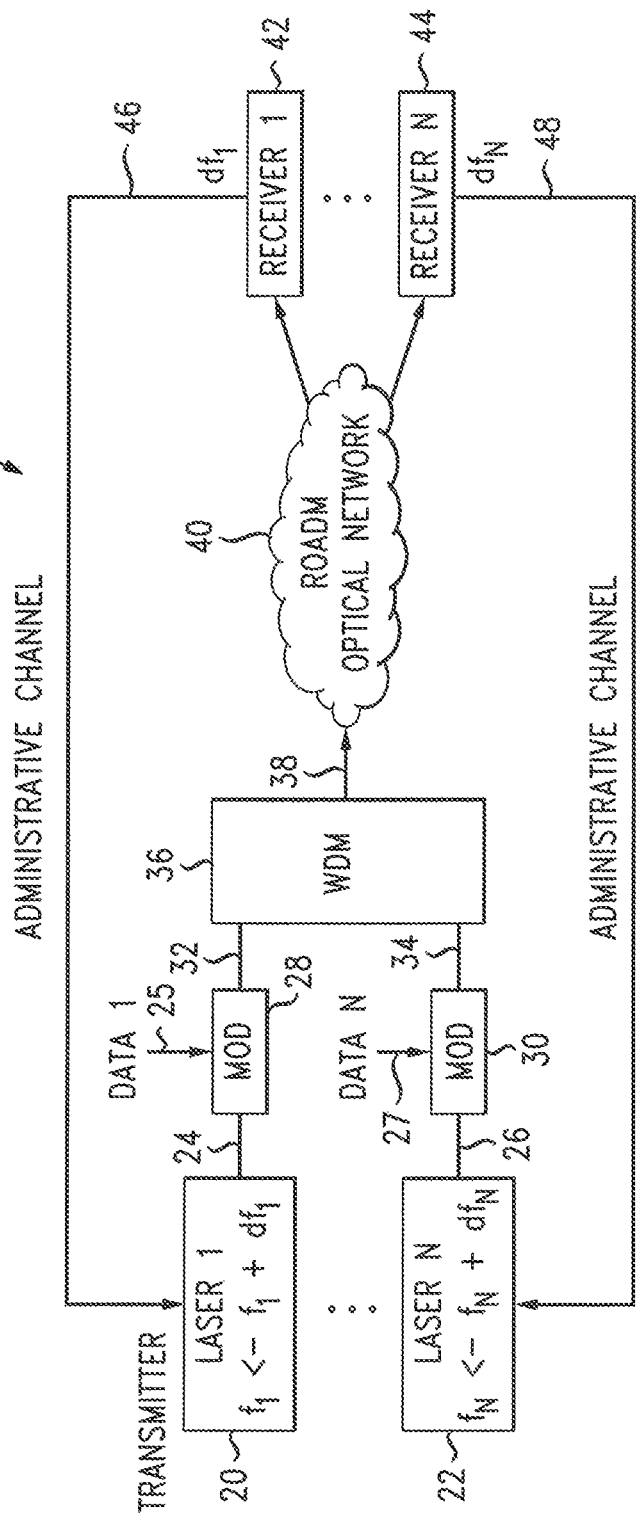
FIG. 2 shows a block diagram of an embodiment of the present invention.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

Embodiments disclosed herein are directed to a method, apparatus, and computer-readable medium that provide end-to-end carrier frequency control to improve an effective channel bandwidth in an optical network using wavelength routing devices, such as optical reconfigurable add/drop multiplexers (ROADMs). Transmitter laser frequency is dynamically adjusted to achieve improved receiver performance by introducing an end-to-end automatic frequency control (AFC) loop, in which performance is monitored and sent back to a transmitter to enable adjustment of the transmitter laser frequency. The laser frequency is adjusted to be aligned to a center of a channel or sub-channel bandwidth. This end-to-end adaptive control of carrier frequency effectively reduces a bandwidth guard band allotted for each channel from several gigahertz (GHz) to tens or hundreds of megahertz (MHz). The result is a significant improvement in channel bandwidth utilization for high-speed transport systems, in which spectral efficiency is a useful component in reducing transport costs.

ROADMs are used to give add/drop flexibility to nodes in a ring and to efficiently interconnect rings or construct a mesh. ROADMs solve three primary problems: (1) reduce time and labor associated with the manual provisioning needed for F-OADM sites, (2) reduce the amount of equipment needed at ring and mesh interconnect sites, and 3) reduce the WDM circuit planning cycle to one that is more flexible and adaptable to changes in network requirements.

A primary benefit of ROADM technology is to improve the efficiency of a WDM system at the granularity of a single wavelength. While the terms fixed versus reconfigurable are akin to manually intensive versus automated, larger WDM spans, in both quantity of nodes and distance, can be built with ROADM-enabled WDM gear.

An industry standard, which is complementary to ROADM technology, is the Optical Transport Network (OTN), otherwise known as the digital wrapper or the ITU G.109 standard. While this standard was written to address the growing migration of services onto optical transport, with defined operations, administration, and maintenance (OA&M) procedures similar to SONET/SDH, OTN also offers a way to groom multiple services onto optical wavelengths, including sub-wavelength (sub-wave) grooming. This grooming creates additional efficiencies in optical networks and allows routing of multiple lower speed optical services over multiple wavelengths, thus creating a type of wavelength router.

ROADMs are evolving from their original functions with new generations of innovation and technology choices. A combination of electrical switching (or sub-wave grooming) capabilities and optical switching capabilities at a ROADM node site allows even more efficiencies for carrier network designs.

A reconfigurable optical add-drop multiplexer (ROADM) is a device that can add, block, pass, or redirect modulated infrared (IR) and visible light beams of various wavelengths in fiber optic network. ROADMs are used in systems that employ wavelength division multiplexing.

Before the development of optical multiplexing devices such as ROADMs, signal routing in fiber optic networks was performed by converting the IR or visible beams to electrical signals and routing those signals using conventional electronic switches. The rerouted electrical signals were then converted back into IR or visible beams.

In a conventional ROADM, switching is accomplished without optical-to-electrical or electrical-to-optical conversion using three operations called add, drop and cut-through. An outgoing IR or visible beam can be generated (the add operation) or an incoming beam terminated (the drop operation). A beam can also be passed through the device without modification (the cut-through operation). In combination, these functions allow optical signal routing of considerable complexity. Configuration of the system can be changed remotely.

Two major ROADM technologies are uses. They are called wavelength blocking (WB) and planar light-wave circuit (PLC). Wavelength blocking, also called first-generation ROADM technology, is the older of the two. When a wavelength change is necessary for a particular channel, the IR or visible light beam at the original wavelength is filtered out and its data extracted. Then, the data is impressed onto a beam of another wavelength. Second-generation ROADM technology in effect combines these steps, streamlining the process and reducing the cost.

Neither the WB nor the PLC ROADM designs facilitate true optical branching, in which beams of any wavelength can be directly routed to any desired port without the need to perform multiple intermediate operations. Optical branching capability is important in the deployment of efficient, reliable, high-volume optical networks designed to provide advanced services such as video on demand (VoD). An evolving technology called enhanced ROADM (eROADM) makes true optical branching possible.

ROADM node functions include the following:
1. Remotely reconfigurable OADM: with appropriate cards installed in a ROADM system, an operator in a NOC (network operation center) can provision services by reconfiguring which wavelength or wavelengths are added and which are dropped, and similarly, which wavelengths are passed through, without a technician visit to the ROADM node site.
2. Granularity of add or drop on a single wavelength; the ROADM capability is superior to previous technology that typically added or dropped a band of four (4) or more wavelengths.
3. Power level of all wavelengths on a fiber is automatically equalized when an add/drop/pass-through configuration is changed.
4. Most ROADM systems constantly monitor power to ensure signal quality
5. 2-degree ROADMs are used in nodes in a ring (or nodes on a mesh line) where there are only East-West connections, that is, where there is no interconnection of a ring, mesh, or spur.
6. N-degree ROADMs (N=3, 4, or more) are used at ring and mesh interconnect points, and at spur points.

Thus, not only are ROADMs remotely configurable (unlike their earlier F-OADM cousins) but many human labor-intensive functions are automated. ROADM-enabled equipment is used by service providers to build a versatile, agile, quickly provisioned optical transport layer. This transport network can scale in both distance and number of nodes. ROADM systems are designed to help service providers respond to new bandwidth demands, being forgiving to forecasting inaccuracies and network churn. F-OADMs solve capacity problems and are more cost-effective if relative wavelength capacity needs at each node on a ring are predictable, but are inflexible for spontaneous bandwidth needs.

Wavelength-division multiplexing (WDM) is a method of combining multiple signals on laser beams at various infrared (IR) wavelengths for transmission along fiber-optic media. Each laser is modulated by an independent set of signals. Wavelength-sensitive filters, the IR analog of visible-light color filters, are used at the receiving end.

WDM is similar to frequency-division multiplexing (FDM). However, instead of taking place at radio frequencies (RF), WDM is done in the IR portion of the electromagnetic (EM) spectrum. Each IR channel carries several RF signals combined by means of FDM or time-division multiplexing (TDM). Each multiplexed IR channel is separated, or demultiplexed, into the original signals at the destination. Using FDM or TDM in each IR channel in combination with WDM of several IR channels, data in different formats and at different speeds can be transmitted simultaneously on a single fiber.

In early WDM systems, there were two IR channels per fiber. At the destination, the IR channels were demultiplexed by a dichroic (two-wavelength) filter with a cutoff wavelength approximately midway between the wavelengths of the two channels. It soon became clear that more than two multiplexed IR channels could be demultiplexed using cascaded dichroic filters, giving rise to coarse wavelength-division multiplexing (CWDM) and dense wavelength-division multiplexing (DWDM). In CWDM, there are usually eight different IR channels, but there can be up to 18. In DWDM, there can be dozens. Since each IR channel carries its own set of multiplexed RF signals, it is theoretically possible to transmit combined data on a single fiber at a total effective speed of several hundred gigabits per second (Gbps).

The use of WDM can multiply the effective bandwidth of a fiber optic communications system by a large factor. However, its cost is weighed against the alternative of using multiple fibers bundled into a cable. A fiber optic repeater device or erbium amplifier promises to make WDM a cost-effective long-term solution to the bandwidth exhaustion problem.

The popularity of using remote configurable optical add/drop multiplexers (ROADMs) in optical networks to optically route wavelengths is driven by the need for lower cost, greater flexibility in data formats, and hitless capacity upgrades. For such a network, an achievable spectral efficiency (SE) and overall fiber capacity is limited, not only by noise from optical amplifiers and fiber nonlinearity, but also from channel narrowing caused by wavelength selective devices in the ROADMs.

The impact of carrier frequency drift on effective channel bandwidth is shown in FIG. 1. To operate such a network with maximum spectral efficiency, the carrier frequency 10 should be aligned with the center of the signal channel bandwidth, as shown in FIG. 1A, in order to provide a maximum effective channel bandwidth 12.

Typically, however, the carrier frequency from a commercial tunable laser can drift up to ±2.5 GHz. To accommodate such a large frequency uncertainty, an additional 5 GHz channel bandwidth guard band is incorporated into the system design, which substantially reduces the effective signal channel bandwidth, as shown in FIG. 1B. FIG. 1B illustrates the carrier frequency 10 when not aligned to the center of the signal channel bandwidth, which results in reducing the effective signal channel bandwidth 14 by a frequency delta (df) 16 when compared with the effective signal channel bandwidth 12 shown in FIG. 1A.

Although a 5 GHz effective bandwidth reduction is not an insurmountable problem in 40G- and 100G-based systems using polarization-division-multiplexed (PDM) quadrature phase shift keying (QPSK) modulation formats, this reduction become a much greater issue in 400G-based systems. This is due to a lack of options in 400G-based systems, which can increase spectral efficiency by using modulation formats having greater spectral efficiency without introducing significant noise sensitivity penalties. That is, to achieve the same wavelength-division-multiplexing (WDM) spectral efficiency, a higher-order quadrature amplitude modulation (QAM) format is used to compensate for the reduction in effective channel bandwidth. For example, if 16QAM is upgraded to 32QAM, or if 32QAM is upgraded to 64QAM. However, the use of higher order QAM formats require greater optical signal-to-noise ratio (OSNR) to achieve the same bit-error ratio (BER) performance, which results in reduced transmission reach. In addition, the signal channel bandwidth center frequency may also drift over time due to drift of the pass-band in a ROADM as a result of temperature changes and device aging processes. This further reduces the effective channel bandwidth. Thus, there is a demonstrated need to improve the effective channel bandwidth in ROADM-based WDM optical networks for future transport systems, such as, but not limited to 400G transport systems.

Embodiments disclosed herein are directed to end-to-end carrier frequency control to address the issues discussed above. In the disclosed embodiments, at least a portion of a set of performance parameters is continuously monitored and feedback based thereon is provided to the transmitter in order to adjust the transmitter laser frequency in an adaptive manner so that the carrier frequency is aligned to the center of the WDM signal channel bandwidth.

A block diagram of an embodiment is shown in FIG. 2. The embodiment includes N transmitters 20, 22, in which N is a positive integer. N WDM channel signals 24, 26 from the transmitters 20, 22 are modulated with appropriate data 25, 27 by modulators 28, 30, respectively. Modulated signals 32, 34 from the modulators 28, 30 are then multiplexed by a wavelength division multiplexer (WDM) 36, and a multiplexed WDM signal 38 from the WDM 36 is provided to a ROADM-based optical network 40. The optical network 40 provides signals to receivers 42, 44. In addition to performing detection, demodulation, and decoding functions, the receivers 42, 44 continuously monitor performance information or parameters, which are used to determine carrier frequency offset information. The carrier frequency offset information provides an indication of a magnitude of the carrier frequency offset from the center of the signal channel bandwidth. Based on the monitored performance parameters, the receivers 42, 44 determine a carrier frequency offsets $df_1$, $df_N$ and provide the carrier frequency offsets $df_1$, $df_N$ to the appropriate transmitter 20, 22 through administration channels 46, 48 that use an administration channel bandwidth that may, for example, be a supervisory channel.

The regular supervisory channels 46, 48 are independent and slower than the signal channels that connect optical network elements, such as the transmitters 20, 22, receivers 42, 44, optical amplifier, optical network 40, and the like. The administrative or supervisory channels 46, 48 essentially enable network elements to send status information to the central control system or receive control information from the central control system. The supervisory channels 46, 48 also provide extra communication channels between the transmitters 20, 22 and receivers 44, 46 that are used to transfer service provisioning information. Generally, a frequency from bandwidth allocated to the signal is used to accommodate the supervisory channels. Once the transmitters 20, 22 receive the carrier frequency offsets $df_1$, $df_N$, the transmitter 20, 22 adjusts their carrier frequency accordingly. Such a feedback-based frequency control method automatically tracks and adjusts the carrier frequency to ensure that the carrier frequency remains centered in the WDM signal channel bandwidth, thus alleviating the need for a large channel bandwidth guard band.

The monitored performance information can also be sent from the receiver to the transmitter by using an administration channel or bandwidth that is within the signal channel or signal channel bandwidth for a bi-directional communication system. For example, the monitored performance information at the receiver 42 can be sent back to the transmitter 20 by adding overhead into the signal channel or signal channel bandwidth that sends signals from the transmitter 20 to the receiver 42.

The performance parameters monitored by the receivers 42, 44 include, but are not limited to a pre-forward-error correction (FEC) bit error ratio (BER), which is calculated by using the error-corrected signal as the reference signal and assuming no errors after FEC decoding, the asymmetric spectral shape of the received optical signal, and the spectral shape of the adaptive filters/equalizers used in a coherent receiver. These shapes are relevant since carrier frequency offsets $df_1$, $df_N$ can result in a distorted signal spectrum and/or a distorted equalizer filter shape. If frequency stability of the receivers 42, 44 reference laser, which is determined by a common local oscillator in the receivers 42, 44, is greater than that of the transmitter laser, the frequency drift associated with the transmitter laser is determined and monitored by using an estimated signal local oscillator frequency offset and a carrier recovery circuit in the receivers 42, 44. For a typical coherent receiver, the signal local oscillator frequency offset is continuously monitored, estimated, and removed prior to signal demodulation. If the signal local oscillator frequency is stable and is in the center of the signal channel bandwidth, then the estimated signal local oscillator frequency offset will be equal to the signal-channel frequency offset and can be directly used for adjusting the carrier frequency. The carrier frequency offset is minimized by reducing the pre-FEC BER, signal spectrum distortion, and/or equalizer filter shape distortion. That is, when the carrier frequency is aligned to the center of the signal channel bandwidth, a minimum pre-FEC BER, and reduced signal spectrum distortion, and/or equalizer filter shape distortion are exhibited.

Pre-FEC BER is monitored in optical communication systems for maintenance and network management purposes. Thus, pre-FEC BER is a reliable parameter to use for determining whether the transmitter laser frequency is aligned at the center of the signal channel bandwidth via the feedback-based control loop. Pre-FEC BER increases as the carrier frequency offset increases. A minimum value for pre-FEC BER is achieved when the carrier frequency offset is zero, which indicates that the transmitter laser frequency is aligned to the center of the signal channel bandwidth. Accordingly, the transmitter laser frequency is adjusted, for example, based on the following equations:

$$f(t+dt) = F(t) + df(t) \qquad (1)$$

and $$df(t) = g \log(BER(t+dt)/BER(t)) \qquad (2),$$

where f(t) represents the carrier frequency prior to adjustment via the feedback loop, f(t+dt) represents the carrier frequency following adjustment by the carrier frequency offset, BER(t) represents the monitored pre-FEC BER before adjustment by the carrier frequency offset, BER(t+dt) represents the monitored pre-FEC BER following adjustment by the carrier frequency offset, g represents a loop control constant, and df(t) represents the calculated frequency adjustment required for the transmitter laser.

The calculation of df(t) can be determined at the receivers 42, 44, and the value of df(t) can then be provided to the transmitters 20, 22, as shown in FIG. 2. Alternatively, the carrier frequency offset df(t) can be calculated at the transmitters 20,22 by sending the monitored parameter or parameters, such as the pre-FEC BER value, to the transmitters 20, 22.

If the signal power spectrum or equalizer filter spectrum is monitored, then df(t) can be determined, for example, by the following equation:

$$df(t) = g(P_{high} - P_{low}) \qquad (3),$$

where $P_{high}$ represents a monitored signal power or the equalizer filter spectrum in a higher frequency region, i.e. from 0 to a symbol signal rate Fs, $P_{low}$ represents the monitored signal power or equalizer filter spectrum in a lower-frequency region, that is, from 0 to −Fs. The per-channel optical signal spectrum can be monitored prior to optical-electrical (OE) conversion, or can also be monitored after OE conversion in a coherent receiver since the full electrical field information of the optical signal is preserved following OE conversion for a coherent receiver. The equalizer filter shape is monitored in a coherent receiver.

Embodiments disclosed herein are also applicable to WDM systems using multiple sub-carriers for each channel. If all subcarriers are frequency locked at the transmitter, the frequency drifts are identical for each of the subcarriers. In this case, only the two outermost subcarriers at the receiver are monitored since performance associated with these subcarriers is more sensitive to the impact of carrier frequency offset, and the required frequency adjustment for each subcarrier within the same channel should be identical. If the subcarriers are generated from independent laser sources, each subcarrier is monitored at the receiver since the frequency offset for each subcarrier may be different, and thus the required frequency adjustment for each subcarrier can be different.

Embodiments disclosed herein effectively eliminate the need for a large channel guard band in WDM system designs, which translates into greater than a 10% increase in spectral utilization in standard 50 GHz-spaced WDM systems. Such an improvement in spectral utilization is especially important for future 400G-based systems since there is very little room to further increase spectral efficiency by increasing modulation levels due to the fundamentally nonlinear Shannon limitation in such high-speed systems. The disclosed embodiments enable a substantial increase in spectral efficiency without reducing transmission reach, which further reduces the cost per transmitted bit.

Since most European countries and some Asian countries, such as Japan and China, are moving to deploy ROADM-based wavelength-routing optical networks, the embodiments disclosed herein provide an effective solution to improve channel bandwidth utilization, and thus are of significant interest to each of these countries as well.

FIG. 3 is a block diagram of an embodiment of a machine in the form of a computing system 100, within which a set of instructions 102, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 100 may include a processing device(s) 104 (e.g., a central processing unit (CPU), a graphics processing unit (GPU), or both), program memory device(s) 106, and data memory device(s) 108, which communicate with each other via a bus 110. The computing system 100 may further include display device(s) 112 (e.g., liquid crystals display (LCD), a flat panel, a solid state display, or a cathode ray tube (CRT)). The computing system 100 may include input device(s) 146 (e.g., a keyboard), cursor control device(s) 116 (e.g., a mouse), disk drive unit(s) 118, signal generation device(s) 119 (e.g., a speaker or remote control), and network interface device(s) 124.

The disk drive unit(s) 118 may include machine-readable medium(s) 120, on which is stored one or more sets of instructions 102 (e.g., software) embodying any one or more of the methodologies or functions disclosed herein, including those methods illustrated herein. The instructions 81 may also reside, completely or at least partially, within the program memory device(s) 106, the data memory device(s) 108, and/or within the processing device(s) 104 during execution thereof by the computing system 100. The program memory device(s) 106 and the processing device(s) 104 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium containing instructions 102, or that which receives and executes instructions 102 from a propagated signal so that a device connected to a network environment 122 can send or receive voice, video or data, and to communicate over the network 122 using the instructions 102. The instructions 102 may further be transmitted or received over a network 122 via the network interface device(s) 124. The machine-readable medium may also contain a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. §1.12 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A system to provide carrier frequency control in an optical network, the system comprising:
   a processing device; and
   a memory to store instructions that, when executed by the processing device perform operations comprising:
   monitoring performance information associated with the optical network;
   transferring the performance information from a first network element to a second network element using an administrative channel and an administrative channel bandwidth;
   modifying a carrier frequency associated with the second network element based on the performance information such that the carrier frequency is aligned to a center of a signal channel bandwidth; and
   monitoring outermost subcarriers by the first network element in response to frequency locked sub-carriers being within the signal channel bandwidth.

2. The system defined by claim 1, wherein the performance information comprises carrier frequency offset information, the operations further comprising determining the carrier frequency offset information by the first network element.

3. The system defined by claim 1, wherein the operations further comprise determining carrier frequency offset information based on the performance information by the second network element.

4. The system defined by claim 1, wherein the first network element comprises a receiver.

5. The system defined by claim 1, wherein the second network element comprises a transmitter.

6. The system defined by claim 1, wherein the performance information comprises carrier frequency offset information.

7. The system defined by claim 1, wherein the performance information comprises pre-forward error correction bit error ratio information.

8. The system defined by claim 7, wherein the operations further comprise calculating the pre-forward error correction bit error ratio information using an error-corrected signal as a reference signal and assuming no errors following error correction decoding.

9. The system defined by claim 1, wherein the performance information comprises spectral shape information associated with a received optical signal.

10. The system defined by claim 1, wherein the performance information comprises spectral shape information associated with an adaptive filter in a coherent receiver.

11. The system defined by claim 1, wherein the administration channel bandwidth comprises an administrative channel bandwidth transferring service provisioning information.

12. The system defined by claim 1, wherein the optical network comprises a remotely reconfigurable optical add/drop multiplexer network.

13. The system of claim 1, wherein the operations further comprise monitoring t a plurality of subcarriers by the first network element in response to sub-carriers generated by independent laser sources being within the signal channel bandwidth.

14. A method of providing carrier frequency control in an optical network, the method comprising:
    transmitting performance information associated with the optical network by a first network element to a second network element using an administration channel bandwidth;
    modifying the carrier frequency by the second network element based on the performance information such that the carrier frequency is aligned to a center of a signal channel bandwidth; and
    monitoring outermost subcarriers by the first network element in response to frequency locked sub-carriers being within the signal channel bandwidth.

15. The method defined by claim 14, wherein the performance information comprises carrier frequency offset information, the method further comprising determining the carrier frequency offset information by the first network element.

16. The method defined by claim 14, further comprising determining carrier frequency offset information by the second network element based on the performance information.

17. The method of claim 14, further comprising monitoring a plurality of subcarriers by the first network element in response to sub-carriers generated by independent laser sources being within the signal channel bandwidth.

18. A computer-readable device to store instructions that, when executed by a processing device, cause the processing device to perform operations comprising:
    transmitting performance information associated with the optical network by a first network element to a second network element using an administration channel bandwidth;
    modifying the carrier frequency by the second network element based on the performance information such that the carrier frequency is aligned to a center of a signal channel bandwidth; and
    monitoring outermost subcarriers by the first network element in response to frequency locked sub-carriers being within the signal channel bandwidth.

* * * * *